United States Patent [19]

Suzuki

[11] 4,254,434
[45] Mar. 3, 1981

[54] VIDEO SIGNAL MIXING SYSTEM

[75] Inventor: Toshio Suzuki, Yokohama, Japan

[73] Assignee: Sony Corporation, Tokyo, Japan

[21] Appl. No.: 95,168

[22] Filed: Nov. 19, 1979

[30] Foreign Application Priority Data

Nov. 24, 1978 [JP] Japan ................................ 53-145104

[51] Int. Cl.$^3$ ........................ H04N 5/16; H04N 7/08; H04N 5/22
[52] U.S. Cl. ..................................... 358/147; 358/181
[58] Field of Search ........................ 358/142, 147, 181

[56] References Cited

U.S. PATENT DOCUMENTS 3,558,815  1/1971  Banks .................................... 358/181

Primary Examiner—Robert L. Richardson
Attorney, Agent, or Firm—Hill, Van Santen, Steadman, Chiara & Simpson

[57] ABSTRACT

A video signal mixing system in which a blanking portion is formed at a predetermined interval in a first video signal by a blanking signal, and a second video signal is inserted into the formed blanking portion of the first video signal, and in which a pedestal level of the first video signal, is detected and held, and the blanking level of the blanking portion is clamped at the held pedestal level of the first video signal with the application of the blanking signal.

7 Claims, 6 Drawing Figures

PRIOR ART

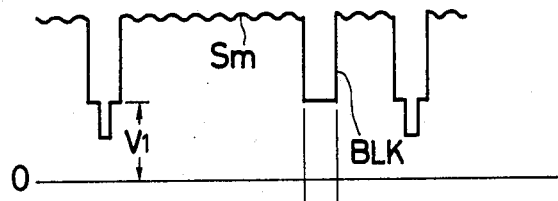
FIG.5A
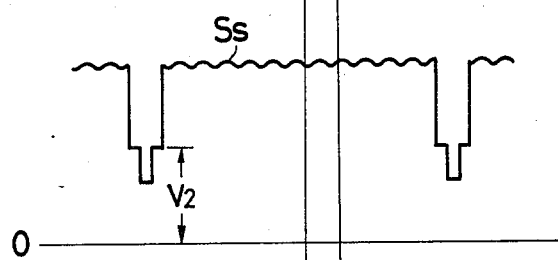
FIG.5B
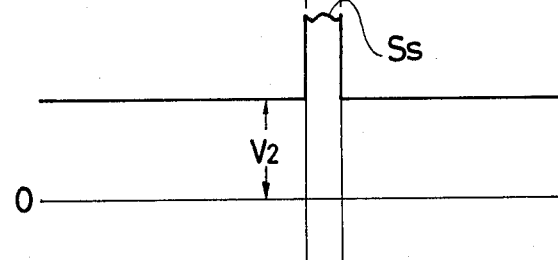
FIG.5C
FIG.5D
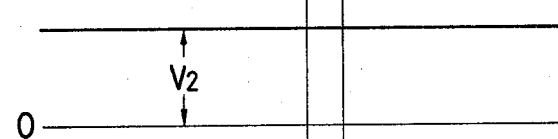
FIG.5E
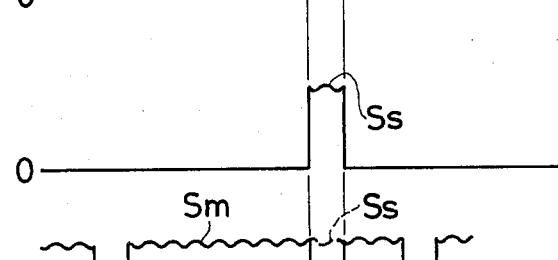
FIG.5F
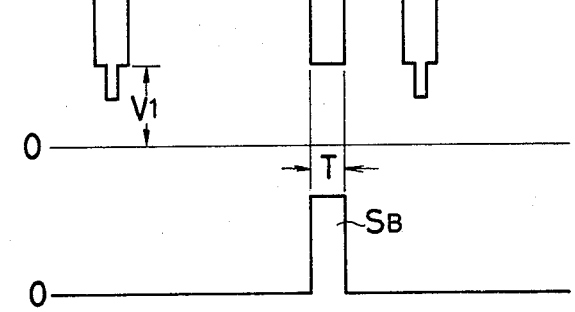
FIG.5G

4,254,434

VIDEO SIGNAL MIXING SYSTEM

BACKGROUND OF THE INVENTION

This invention relates to a video signal mixing system, and more particularly to a video signal mixing system in which a blanking interval is formed at a predetermined portion of a video signal, and another video signal is inserted into the formed blanking interval of the video signal.

In some kinds of television receivers, a reduced picture of one channel broadcast is inserted into a picture of another channel broadcast on one screen, or letters or figures are inserted into a picture of one channel broadcast on one screen. The reduced picture, or the letters or figures to be inserted will be called "sub picture" hereinafter. The picture into which the sub picture is inserted will be called "main picture" hereinafter. Video signals for the main picture and sub picture will be called "main video signal" and "sub video signal", hereinafter respectively.

Blanking intervals are formed at predetermined portions of the main video signal. The sub video signal is inserted into the formed blanking intervals. The blanking level is nearly equal to zero. Generally, pedestal levels of the main video signal and sub video signal are different from each other. Accordingly, when the sub video signal is inserted into the blanking intervals of the main video signal, the brightnesses of the main picture and sub picture are different from each other. It is visually preferable that they are equal to each other.

For example, two external variable resistors are provided for removing such difference. In this case, the variable resistors should be individually adjusted. After one of the two variable resistors is adjusted, another of the two variable resistors is adjusted. Or it has been considered to interconnect the two variable resistors so as to remove the above described difference. However, such methods are not preferable.

SUMMARY OF THE INVENTION

Accordingly, it is an object of this invention to provide a video signal mixing system by which the above described problem can be solved.

Another object of this invention is to provide a video signal mixing system in which the brightnesses can be easily adjusted.

In accordance with an aspect of this invention, there is provided a video signal mixing system in which a blanking portion is formed at a predetermined interval in a first video signal by a blanking signal, and a second video signal is inserted into the formed blanking portion of the first video signal, and in which a pedestal level of the first video signal is detected and held, and the blanking level of the blanking portion is clamped at the held pedestal level of the first video signal with the application of the blanking signal.

The above and other objects, features and advantages of this invention will be apparent in the following detailed description of illustrative embodiment which are to be read in connection with the accompanying drawings.

BRIEF DESCRIPTION OF THE DRAWINGS

FIG. 5A to FIG. 5G are waveforms at the respective parts of the block diagram of FIG. 4.

DESCRIPTION OF THE PREFERRED EMBODIMENTS

Figure 1:
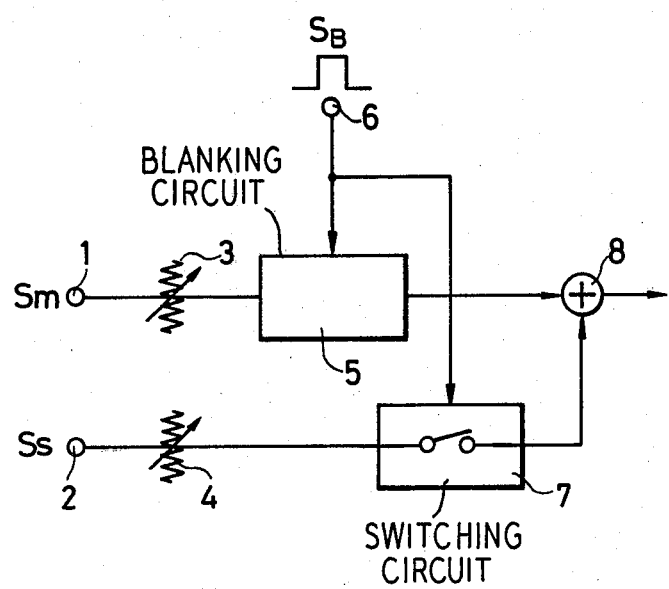
FIG. 1 is a block diagram of a video signal mixing system according to the prior art.
Figure 2A:
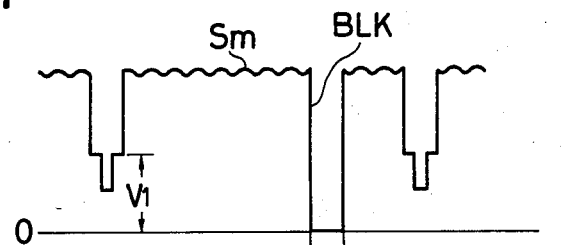
FIG. 2A to FIG. 2E are waveforms at the respective parts of the prior art block diagram of FIG. 1.
Figure 2B:
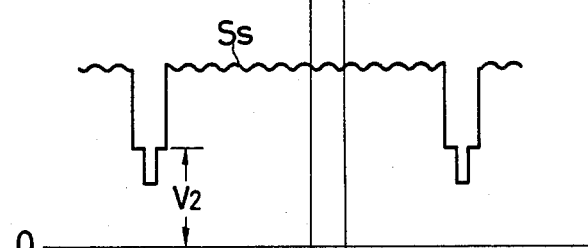

Before proceeding to a detailed description of the present invention and in order to enhance the understanding thereof, a prior art system will be described with reference to FIG. 1 to FIG. 3. In FIG. 1, a main video signal $S_m$ is supplied to an input terminal 1, while a sub video signal $S_s$ as shown in FIG. 2B is supplied to another input terminal 2. The main video signal $S_m$ and the sub video signal $S_s$ are supplied through external variable resistors 3 and 4 to a blanking circuit 5 and to a switching circuit 7, respectively. When a blanking signal $S_B$ having width T as shown in FIG. 2E is supplied to a blanking input terminal 6, the main video signal $S_m$ as shown in FIG. 2A is obtained from the blanking circuit 5, and the switching circuit 7 is closed to sample sub video signal $S_s$. FIG. 3 shows one example of the blanking circuit 5. In FIG. 3, the main video signal $S_m$ is supplied to an input terminal 9. When the blanking signal $S_B$ as shown in FIG. 2E is supplied to a base terminal of a transistor Q to turn on the latter, the main video signal $S_m$ is muted for the time T, namely blanked to zero for the time T as shown in FIG. 2A. The main video signal $S_m$ having the blanking interval is obtained from an output terminal 10.

Figure 2C:
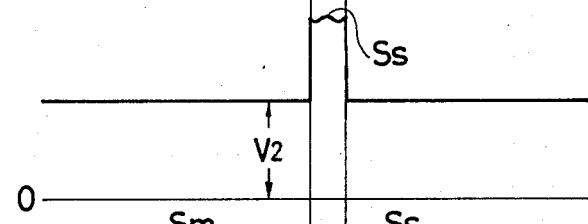
Figure 2D:
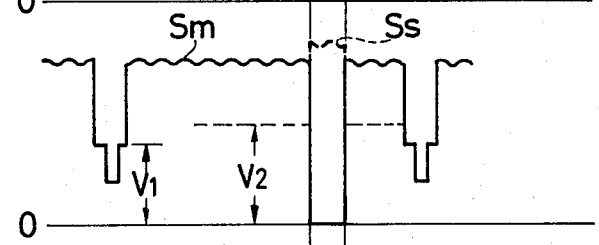
Figure 2E:
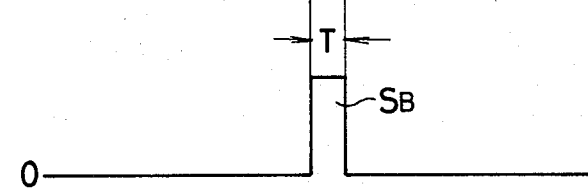
Figure 3:
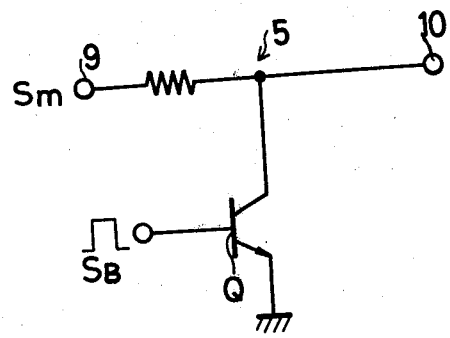
FIG. 3 is a circuit diagram of an example of a portion of the block diagram of FIG. 1.

Referring again to FIG. 1, when the blanking signal $S_B$ is supplied to the input terminal 6, the main video signal $S_m$ as shown in FIG. 2A and the sub video signal $S_s$ sampled as shown in FIG. 2C are supplied to a mixing circuit 8. The main video signal $S_m$ has a pedestal level $V_1$ as shown in FIG. 2A, and the sub video signal $S_s$ has another pedestal level $V_2$ as shown in FIG. 2B. Generally, the pedestal levels $V_1$ and $V_2$ are different from each other. When the pedestal level $V_1$ is lower than the other pedestal level $V_2$, a mixed video signal as shown in FIG. 2D is obtained from the mixing circuit 8, although the level of the sampled sub video signal $S_s$ should be aligned with the level of the main video signal $S_m$ in the mixed video signal. The external variable resistors 3 and 4 should be adjusted to remove the difference between the pedestal levels $V_1$ and $V_2$.

Next, the principle of this invention will be described with reference to FIG. 4 and FIG. 5.

Figure 4:
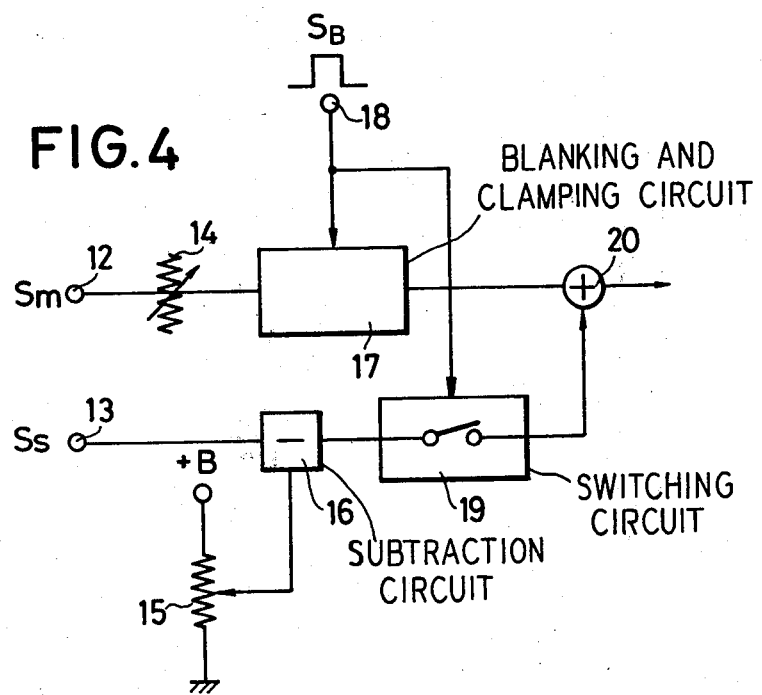
FIG. 4 is a block diagram of a video signal mixing system for explaining the principle of this invention.

In FIG. 4, the main video signal $S_m$ is supplied to an input terminal 12, while the sub video signal $S_s$ is supplied to another input terminal 13. The main video signal $S_m$ is supplied through an external variable resistor 14 to a blanking and clamping circuit 17. The sub video signal $S_s$ is supplied to a subtractor 16. Further, a DC voltage $V_2$ taken out from a potentiometer 15, as shown in FIG. 5D, is supplied to the subtracter 16. The DC voltage $V_2$ is equal to the pedestal level $V_2$ of the sub video signal $S_s$. An output terminal of the subtractor 16 is connected through a switching circuit 19 to a mixing circuit 20. Further, the blanking and clamping circuit 17 is connected to the mixing circuit 20. A blanking signal $S_B$ is supplied to an input terminal 18.

When the blanking signal $S_B$ as shown in FIG. 5G is supplied to the input terminal 18, the main video signal $S_m$ as shown in FIG. 5A is obtained from the blanking and clamping circuit 17. As shown in FIG. 5, the blanking level of the blanked portion of the main video signal $S_m$ is clamped at the pedestal level $V_1$. The DC voltage $V_2$ is subtracted from the sub video signal $S_s$ as shown in FIG. 5B by the subtractor 16. As a result, only a variable signal component higher than the pedestal level $V_2$ of the sub video signal $S_s$ is supplied to the switching circuit 19. When the switching circuit 19 is closed with the blanking signal $S_B$, the variable signal component of the sub video signal $S_s$ is sampled, as shown in FIG. 5E, and is supplied to the mixing circuit 20. The sampled variable signal component of the sub video signal $S_s$ is inserted into the formed blanking interval BLK of the main video signal $S_m$, in the mixing circuit 20. As a result, the mixed video signal as shown in FIG. 5F is obtained from the mixing circuit 20. As shown in FIG. 5F, the levels of the main and sub video signals $S_m$ and $S_s$ are aligned with each other.

Next, an embodiment based on the above-described principle of this invention will be described with reference to FIG. 6.

Figure 6:
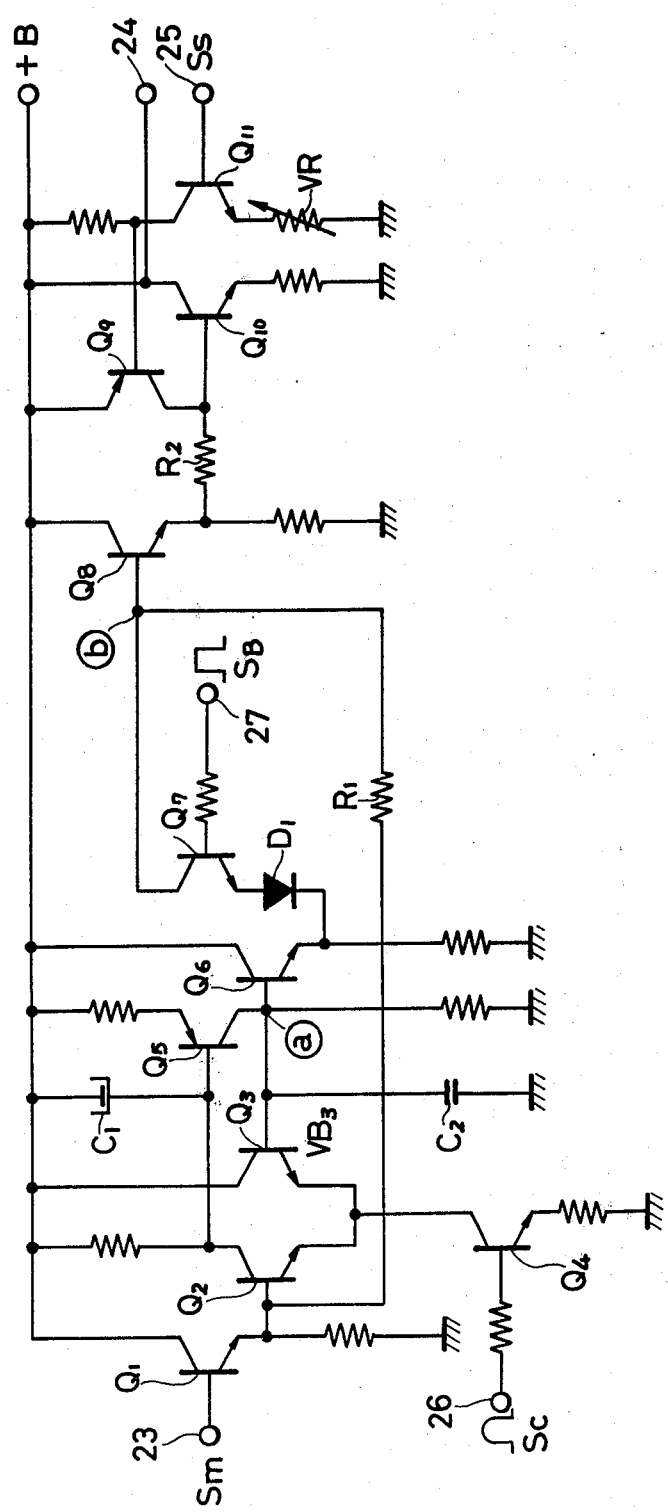
FIG. 6 is a circuit diagram of a video signal mixing system according to one embodiment of this invention.

In FIG. 6, a main video signal $S_m$ is applied through an input terminal 23 to a base of a transistor $Q_1$. An emitter of the transistor $Q_1$ is connected to a transistor $Q_2$, and through a resistor $R_1$ to a transistor $Q_8$. The main video signal $S_m$ obtained from the transistor $Q_8$ is applied through a resistor $R_2$ to a transistor $Q_{10}$ to be amplified by the latter. The amplified video signal is taken out from an output terminal 24.

On the other hand, a sub video signal $S_s$ is applied to a sub video signal input terminal 25 at the blanking time of the main video signal $S_m$ as shown in FIG. 5A. The sub video signal $S_s$ is supplied through a transistor $Q_{11}$ to a base of another transistor $Q_9$ constituting a variable constant current source, and it is inserted into the blanking period of the main video signal $S_m$ through the transistor $Q_9$.

A clamp pulse $S_c$ occurring at the pedestal period of the main video signal $S_m$ is applied to an input terminal 26. For example, the clamp pulse $S_c$ may be obtained by retarding the horizontal synchronizing signal to the pedestal period. While the clamp pulse $S_c$ is supplied to the input terminal 26, a transistor $Q_4$ is in the conductive state. The transistors $Q_2$ and $Q_3$ constitute a differential amplifier, and are put in the active state. An output in accordance with the pedestal level of the main video signal is obtained from the transistor $Q_2$, and is smoothed by a capacitor $C_1$. The smoothed output is amplified by a transistor $Q_5$. The output of the transistor $Q_5$ is smoothed at a point ⓐ by another capacitor $C_2$. The smoothed output is applied as a base voltage $V_{B3}$ to the transistor $Q_3$. Accordingly, whenever the clamp pluse $S_c$ is supplied to the input terminal 26, the pedestal level is compared with the base voltage $V_{B3}$. A feed-back loop is formed so that the difference between the pedestal level and the base voltage $V_{B3}$ becomes equal to zero. As the result, the base voltage $V_{B3}$ is clamped at the pedestal level, and it is supplied through a transistor $Q_6$ to a cathode of a diode $D_1$. In that condition, when the blanking signal $S_B$ is supplied to an input terminal 27, the transistor $Q_7$ becomes conductive. Accordingly, a voltage at point ⓑ connected to a base of the transistor $Q_8$, namely the collector voltage of the transistor $Q_7$, becomes nearly equal to the base voltage $V_{B3}$ clamped at the pedestal level. The voltage $V_{B3}$ is applied through the transistor $Q_6$ as an emitter follower to the cathode of the diode $D_1$. The $V_{BE}$ of the transistor $Q_6$ is cancelled by the diode $D_1$. As a result, the voltage V on the point ⓑ becomes nearly equal to $V_{B3}$. When the blanking signal $S_B$ is supplied to the base of the transistor $Q_7$, the main video signal $S_m$ is blanked by the voltage drop across the resistor $R_1$. As a result, the main video signal $S_m$ having the blanking interval BLK, whose blanking level is nearly equal to the pedestal level $V_1$, is obtained from the transistor $Q_8$, as shown in FIG. 5A.

The sub video signal $S_s$ sampled by the blanking signal $S_B$, as shown in FIG. 5C, is supplied to the input terminal 25. The output of the transistor $Q_{11}$, to the base of which the sampled sub video signal $S_s$ is supplied, is controlled by a variable resistor VR corresponding to the potentiometer 15 of FIG. 4. The transistor $Q_9$ functions as the constant current source. Accordingly, the alternating or signal components of the sampled sub video signal $S_s$ as shown in FIG. 5E are obtained as the voltage drop of the resistor $R_2$ at the collector of the transistor $Q_9$. Thus, the alternating components of the sampled sub video signal $S_s$ are inserted into the blanking interval BLK of the main video signal $S_m$, as shown in FIG. 5F.

According to this invention, the brightnesses of the pictures of the main and sub video signals $S_m$ and $S_s$ can be simultaneously adjusted. In the above description, the voltage to be subtracted from the sub video signal $S_s$ is equal to the pedestal level of the sub video signal $S_s$. However, as occasion demands, the voltage to be subtracted may be different from the pedestal level of the sub video signal $S_s$.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for operating a video signal mixing system, comprising: forming a blanking portion at a predetermined interval in a first video signal by a blanking signal; detecting and holding a pedestal level of said first video signal and clamping a blanking level of said blanking portion at the held pedestal level of said first video signal with the application of said blanking signal; and inserting a second video signal into the formed blanking portion of the first video signal.

2. A method for operating a video signal mixing system according to claim 1 including the steps of sampling said second video signal by said blanking signal, and inserting the sampled second video signal into said blanking portion of the first video signal.

3. A method for operating a video signal mixing system according to claim 2 including the step of subtracting a DC voltage from said sampled second video signal.

4. A method for operating a video signal mixing system according to claim 3 including the step of providing a level of said DC voltage equal to the pedestal level of said second video signal.

5. A method for operating a video signal mixing system according to claim 1 including the step of subtracting a DC voltage from said second video signal, sampling said second video signal by said blanking signal, and inserting the sampled video signal into said blanking portion of the first video signal.

6. A method for operating a video signal mixing system according to claim 5 including the step of providing a level of said DC voltage equal to the pedestal level of said second video signal.

7. A video signal mixing system, comprising: blanking means for forming a blanking portion at a predetermined interval in a first video signal by a blanking signal; clamping means for detecting and holding a pedestal level of said first video signal and clamping a blanking level of said blanking portion at the held pedestal level of said first video signal with the application of said blanking signal; and means for inserting a second video signal into the formed blanking portion of the first video signal.

* * * * *